J. C. Stoddard.
Horse Rake.

Nº 31,414

Patented Feb. 12, 1861.

Witnesses
J W Coombs
R. S. Spencer

Inventor
J. C. Stoddard
per Munn & Co.
Attorneys

UNITED STATES PATENT OFFICE.

J. C. STODDARD, OF WORCESTER, MASSACHUSETTS.

IMPROVEMENT IN RAKE-HEADS.

Specification forming part of Letters Patent No. 31,414, dated February 12, 1861.

*To all whom it may concern:*

Be it known that I, J. C. STODDARD, of Worcester, in the county of Worcester and State of Massachusetts, have invented a new and useful Improvement in Attaching Wire Teeth to Rake-Heads; and I do hereby declare that the following is a full, clear, and exact description thereof, reference being had to the accompanying drawings, making a part of this specification, in which—

Figure 1:
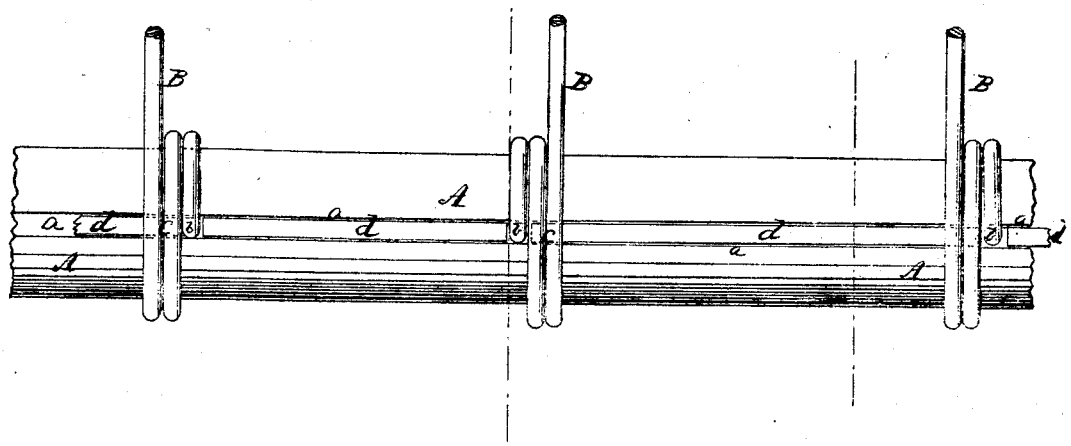
Figure 2:
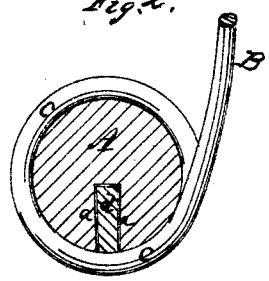
Figure 3:
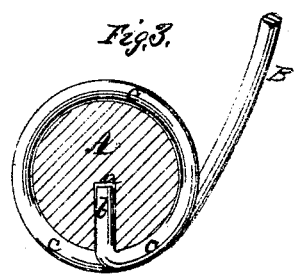

Figure 1 is a view of the bar having three wire rods attached to it after the manner of my invention. Fig. 2 is a transverse section taken through the red line $xx$ marked on Fig. 1. Fig. 3 is a transverse section taken through the red line $yy$ marked on Fig. 1.

Similar letters of reference indicate corresponding parts in the three figures.

This invention relates more especially to hay-rakes and hay-spreading machines; and it is intended to furnish a simple and efficient means for attaching the teeth or tines to their cross bars or heads, whereby the tines may be easily adjusted longitudinally on their bars and securely fixed at any desirable distance apart without bolts, screws, clamps, or anything of the kind.

My invention consists in forming a groove of a sufficient depth from end to end of the bar or head, to which the wire rods are to be attached, and in forming a coil and a hook on one end of the wire rods or teeth to be attached to the bar, as will be hereinafter described, so that the coils can be slipped on the rod with the hook or straight portions in the groove in said bar, using strips of a suitable length and thickness to fit into this groove and to secure the wire rods at the desired distance apart, which strips are held in their places by the coils on the end of the rods, all as will be hereinafter described.

To enable those skilled in the art to fully understand my invention, I will proceed to describe its construction and operation.

A represents a section of a bar, which may be made of wood or metal, and which may be made any desirable diameter and length. In this bar is formed a deep groove, $a$, which extends the entire length of the bar A, and which is in width almost equal to the thickness of the wire rods B, used to form the teeth. The bar being thus prepared to receive the teeth or rods B, one end of a rod is introduced perpendicularly into the slot, and the rod is carried twice or three times round the bar A, forming a hooked portion, B, and a coil, C, on the end of the rod B. Each rod is served in the same way, after which their ends may be hardened so that they will possess the required stiffness and elasticity. In Fig. 3 the perpendicular hooked end B of one of the rods B is shown in its slot $a$ in the bar A. This portion $b$ is confined in the groove $a$ by the coil C of the rod around the bar, which coil serves also to give the required elasticity to the main portion of the rod B, and to keep the strips $a$ down in the grooves $a$, as will be hereinafter described. After the rods B B B are prepared with a coil and a hooked portion on one end of each they are applied to the grooved bar A in the following manner: The strips $d$ are cut the desired length and the coils C are slipped on the bar A, and between each hooked portion B in the groove $a$ a strip, $d$, is introduced, as shown in Fig. 1 of the drawings. These strips all being of an equal length, they keep the rods D at a uniform distance apart and prevent the rods from moving in a direction with the length of the bar A. The strips $d$ are each held in the groove $a$ by the two coils of the rod B, which pass around the bar A and over one end of each strip $d$.

From this description it will be seen that the steel rods B are each secured in place by the strips $d$, together with the tongue or perpendicular hooked end $b$ and the groove $a$, all of which are so combined that they are equally dependent one upon the other for the security of the whole. Should it be found necessary to set the rods B closer together on the bar A it is only necessary to shorten the strips $d$, and if it is desirable to set the rods B farther apart, the strips $d$ are made longer.

Having thus described my invention, what I claim as new, and desire to secure by Letters Patent, is—

Attaching the steel rods B to the head A by means of the hooked end $b$, coil $c$ on the rods, and the slot $a$ and strips $d$ on the head A, substantially in the manner herein set forth.

J. C. STODDARD.

Witnesses:
P. EMORY ALDRICH,
D. W. HASKINS.